United States Patent
Klemetti et al.

(10) Patent No.: US 7,412,255 B2
(45) Date of Patent: Aug. 12, 2008

(54) ANTENNA ARRANGEMENT AND MOBILE TERMINAL DEVICE

(75) Inventors: Raimo Klemetti, Oulu (FI); Kari Räisänen, Oulu (FI); Jarkko Ylisirniö, Oulu (FI); Sami Kolanen, Oulu (FI)

(73) Assignee: Flextronics Sales & Marketing A-P Ltd., Port Louis (MU)

( * ) Notice: Subject to any disclaimer, the term of this patent is extended or adjusted under 35 U.S.C. 154(b) by 1087 days.

(21) Appl. No.: 10/390,914

(22) Filed: Mar. 19, 2003

(65) Prior Publication Data

US 2004/0162107 A1 Aug. 19, 2004

(30) Foreign Application Priority Data

Feb. 14, 2003 (FI) .................................. 20030227

(51) Int. Cl.
*H04M 1/00* (2006.01)
*H04Q 7/20* (2006.01)

(52) U.S. Cl. .............. 455/553.1; 455/422.1; 455/426.2; 455/550.1; 455/552.1

(58) Field of Classification Search .............. 455/553.1, 455/422, 277.1, 552.1, 550.1, 426.1, 426.2, 455/424, 422.1, 277.2, 73, 101
See application file for complete search history.

(56) References Cited

U.S. PATENT DOCUMENTS

| | | | |
|---|---|---|---|
| 6,476,769 B1 | 11/2002 | Lehtola | |
| 6,560,443 B1 * | 5/2003 | Vaisanen et al. | 455/73 |
| 6,731,921 B1 * | 5/2004 | Militz et al. | 455/277.2 |
| 6,826,391 B2 * | 11/2004 | Leinonen et al. | 455/277.1 |
| 7,251,459 B2 * | 7/2007 | McFarland et al. | 455/101 |
| 2003/0078037 A1 * | 4/2003 | Auckland et al. | 455/422 |
| 2003/0176176 A1 * | 9/2003 | Leinonen et al. | 455/277.1 |

FOREIGN PATENT DOCUMENTS

| | | |
|---|---|---|
| EP | 0 823 751 | 2/1998 |
| EP | 0 964 477 | 12/1999 |
| WO | WO 00/48312 | 8/2000 |
| WO | WO 02/07254 | 1/2002 |
| WO | WO 03/050915 | 6/2003 |

* cited by examiner

*Primary Examiner*—Thjuan K. Addy
(74) *Attorney, Agent, or Firm*—Young & Thompson

(57) ABSTRACT

The invention is concerned with an antenna arrangement adapted to a mobile terminal and division of frequency bands between different antennas. The antenna arrangement enables the terminal to operate worldwide in networks applying different frequency bands and technologies, as a so-called multi-band terminal. In the antenna arrangement the frequency bands of the antennas are arranged for each antenna in a way that the bands fill an optimal frequency area, thus accomplishing smaller total volume for the antennas and a good performance.

19 Claims, 11 Drawing Sheets

ANTENNA ARRANGEMENT AND MOBILE TERMINAL DEVICE

FIELD OF THE INVENTION

The invention relates antenna arrangement and division of the frequency bands that are transferred through it between different antennas. The invention is suitable for use in a subscriber terminal using wireless data transfer or in a mobile station such as mobile phone, for example.

BACKGROUND OF THE INVENTION

Nowadays there are available terminals that operate in various different frequency bands. Such terminals have greater performance and, in comparison with older terminals, are better adapted to take advantage of the new services appearing for the terminals all the time.

Terminals adapted for multi-frequency usage may be utilized in those wireless communications networks where the operations have been adapted in advance to function together with the terminals.

For each wireless communications system a previously determined frequency band is assigned for transmission and reception of signals. Wireless communications systems using different frequency bands include for example: digital 2G telecommunications networks, such as GSM (Global Systems for Mobile Telecommunication), DCS (Digital Cellular System), PCS (Personal Communications Services) and 3G UMTS (Universal Mobile Telecommunications System).

DCS and PCS networks are based on GSM technology. UMTS networks in Europe are based on WCDMA (Wideband Code Division Multiple Access) technology. The technology corresponding to 3G UMTS in USA is called CDMA2000.

Subscriber terminal applying wireless data transfer normally consists of at least one antenna for transmission and reception of signals. Placing a single large antenna in the terminal or inside the covering frame may be difficult or even impossible in practice. This is because it might require excessive growth of the physical size of the terminal, which is to be avoided at all cost. With a single antenna it is not possible to achieve a good enough performance in relation to the physical size, in comparison with the multi-band devices using multiple optimised antennas.

One implementation of an antenna arrangement adapted for usage in a multi-band environment is described in the patent publication WO 02/07254. The antenna arrangement tries to accomplish a good barrier damping between single frequency bands and to enable, without active components, separate and self-sufficient radiation curves as well as a large decoupler connection between the frequency bands. According to the publication, this will be accomplished by separating filters utilising frequency-selective filter structure. The filter structure supplied with sufficient barrier damping al-lows dividing the frequency band into two sub-bands. On the one hand, each separating filter combines two signals of different frequencies into one signal, and on the other divides the frequency band coming from the antenna into two frequency bands for two branches. There are always twice as many radiators as there are frequencies. This kind of antenna arrangement is not flexible because the amount of antennas is bound to the amount of frequencies. In addition, since the circuitry of the antenna arrangement is fixed, the filter structure requires a relatively large quantity of filters.

SUMMARY OF THE INVENTION

Objective of the invention is to accomplish an antenna arrangement optimally adapted for as many frequency bands as possible. The frequency bands between the different antennas are divided in a way that allows a relatively easy production of antennas and avoids the need to intentionally cover the frequency areas between RX and TX bands.

The objective is achieved with the method and arrangement in the manner described in the independent patent claims.

The idea behind the invention is to accomplish an antenna arrangement adaptable to a mobile terminal in a way that the frequency design of the arrangement takes into account, as optimally as possible, the bands located in different frequencies. This would make it possible to cover the frequency areas of as many networks as possible with as few antennas as possible, but still achieving a good performance level.

For example, with an antenna arrangement consisting of two or three antennas, it is possible to cover the frequency bands of various different mobile communications systems. In this case the antenna arrangement includes in addition a transmitter/receiver of a multi-mode telephone and a set of filters, as well as at least one controllable switch, which are placed between the antennas and the multi-mode telephone. Each of the antennas is adapted to transmit and/or receive signals of a specific mobile communications system. This is done in an antenna arrangement consisting of two antennas for example by transferring the signals of the different mobile communications systems sent in the air in such a way that the first antenna transmits signals of second, third and fourth systems. Signals of the third system are received through the first antenna and signals of the second and fourth systems are received through the second antenna.

In an antenna arrangement consisting of three antennas signals are transmitted so that the first antenna transmits signals of the second system and the second antenna transmits signals of the fifth system. Signals are received so that signals of the second system are received through the second antenna and signals of the fifth system are received through the third antenna.

In another antenna arrangement consisting of three antennas signals are transmitted so that the first antenna transmits signals of the first and second systems and the second antenna transmits signals of the fifth system. Signals are received so that signals of the first system are received through the first antenna, signals of the second system are received through the second antenna and signals of the fifth system are received through the third antenna.

There are many advantages with an antenna arrangement corresponding to the invention. Antenna arrangement, in which the frequency bands have been arranged in advance optimally for each antenna so that the bands fill an optimal frequency area, makes it possible to achieve a smaller total volume for the antennas as well as good performance. In this way a terminal operating in various different networks and many different bands can be made small in size.

As an additional advantage, the damping in the front end of the terminal may be reduced. In connecting the signals to and from the antenna for example switches realized by MEMS (micro-electromechanical systems) technology, which occupy little space, may be used. The filters placed in the transmitter-receivers may be simple of structure. They can be designed for a narrow band because there is no need for many frequencies to pass through the filters mentioned.

If the terminal is for example of the WCDMA or US3G types (uses PCS band), use of duplexers in the terminal is avoided enabling a simpler structure for the device as well as smaller size and better performance. Isolation between the various receiver and transmitter antennas of the antenna arrangement relieves the filtering requirements of the filters, thus making the designing of antennas smoother and/or reducing the size of the antennas in the antenna arrangement.

BRIEF DESCRIPTION OF THE DRAWINGS

The invention is described more closely with reference to the accompanying drawings, in which.

DETAILED DESCRIPTION OF THE INVENTION

Antenna arrangement corresponding to the invention is suitable for usage in terminals and mobile stations using wireless data transfer. The objective is to cover as large a frequency area as possible with the new antenna arrangement described below, however in a way that keeps the quantity and physical volume of the antennas as small as possible, without affecting the performance. The antenna arrangement makes it possible for a terminal to operate in networks all over the world applying different frequency bands and technologies, as a so-called multi-band terminal.

In the following we will review more closely, by referring to the FIG. 1-6, an implementation where the antenna arrangement is placed in a multi-band mobile station, which we will from now on just call mobile station or terminal. Type of the terminal used or location of the antenna arrangement in the terminal doesn't limit the invention.

Figure 1:
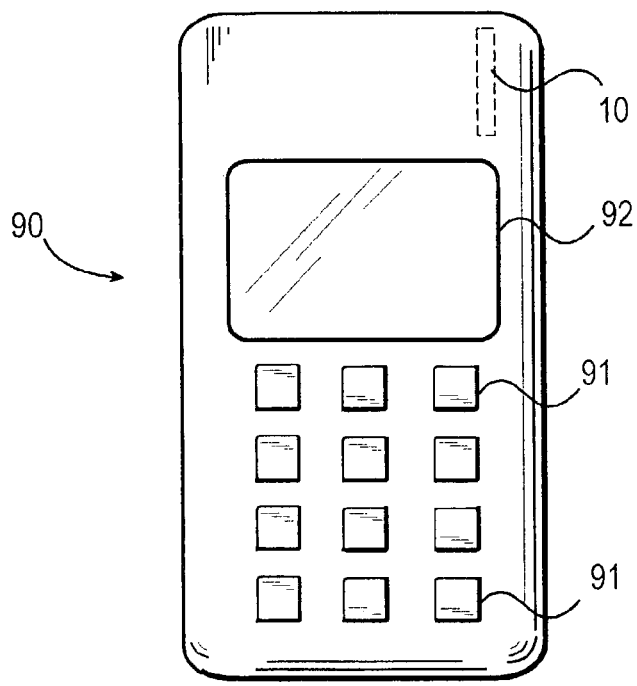
FIG. 1 shows a terminal device applying an antenna arrangement corresponding to the invention, FIG. 2 displays a theoretical block diagram of a subscriber terminal.

FIG. 1 illustrates the location of antenna arrangement 10 in the mobile station 90.

Antenna arrangement corresponding to the implementation alternative of the example covers bands which are used in systems of at least the following standards: GSM850, US-TDMA850, GSM900, GSM1800, GSM1900, US-TDMA1900, W-CDMA and CDMA2000. If a standard includes additional or extended bands, it is presumed that they also belong to the standard if necessary.

The antennas included in an antenna arrangement can be either internal or external antennas. It is possible to optimise their quantity by designating the transmission and/or reception band of the antennas to a specific antenna so that the frequencies left between the bands are covered as little as possible.

The transmission and reception band of the antenna is located in the amplification maximum of the antenna or very near the maximum, so that it is possible to reduce the amplification of the amplifiers located in the transmitting and receiving end of the signal. In this way for example the power consumption of the terminal can also be reduced.

Figure 2:
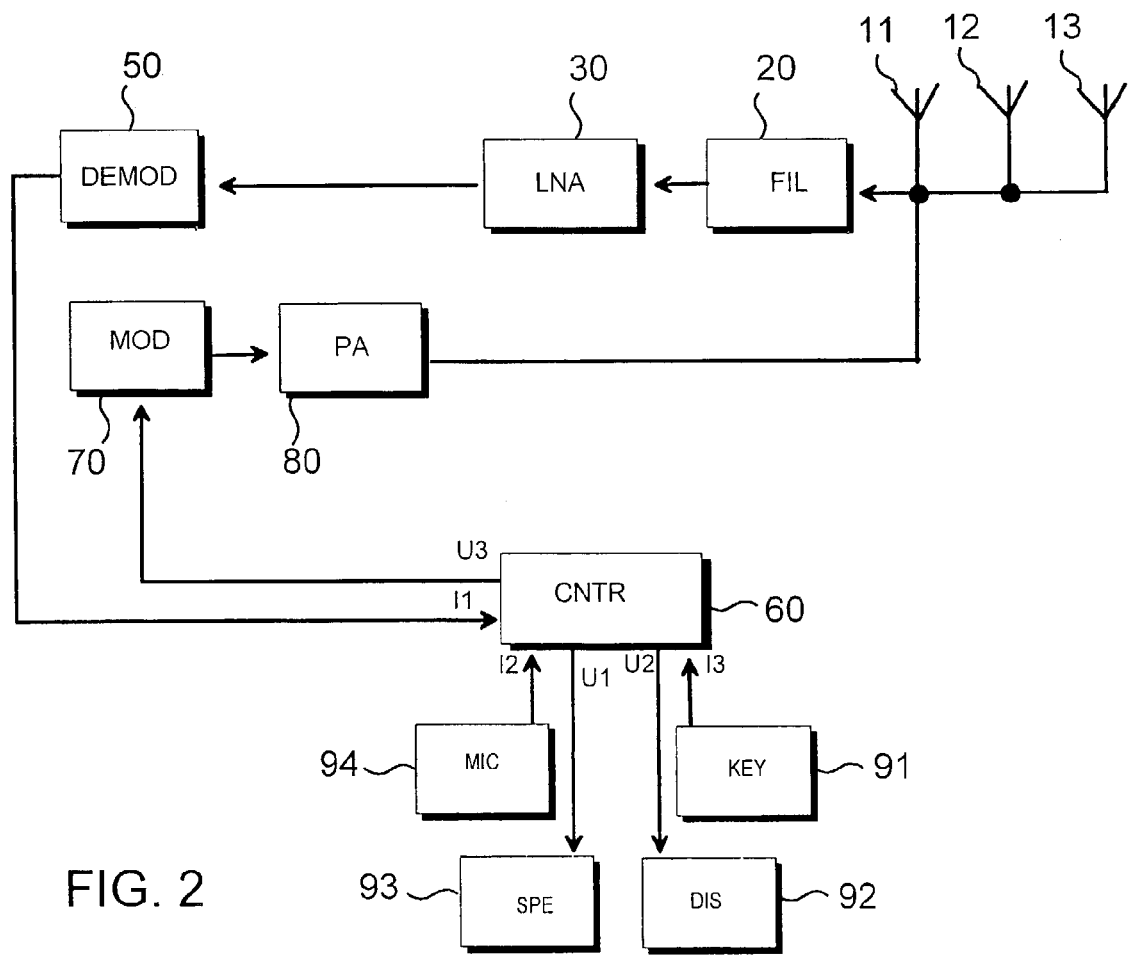

In FIG. 2 essential parts of the mobile station antenna arrangement presented above are illustrated by means of a simplified block diagram.

One of the basic blocks in the receiver side contained in a terminal operating as transmitter-receiver is the filter 20. The rx-direction signal received by the antenna (11, 12, 13) is brought to the input of this filter. The standard and frequency band used determine the antenna through which the terminal receives the signal. The signal received by the antenna is amplified in a low-noise amplifier 30, whose output signal is conveyed to the demodulator 50 for demodulation. In addition the terminal comprises the controller 60, into whose first input 11 the output of the demodulator 50 is functionally connected. In practice the controller consists of a microprocessor and the software needed to process the signal. The controller also receives the signal through a microphone 94 connected to the input gate 12 of the controller and through a keyboard 91 connected to the input gate 13 of the controller and transmits signal to a headphone 93 from the output U1 and to a display screen 92 from output U2. Well-known components may be used as the above-mentioned constituent parts of the terminal.

In the transmission or tx direction the terminal operates in the following manner: the controller 60 processes the signal comprising information, coming from for example a microphone, which is taken to the modulator 70 for modulation. The modulated signal is amplified in a power amplifier 80 and the amplified signal is transmitted to the radio way through some previously-determined antenna. The standard and frequency band used deter-mine the antenna through which the signal is transmitted.

Figure 3:
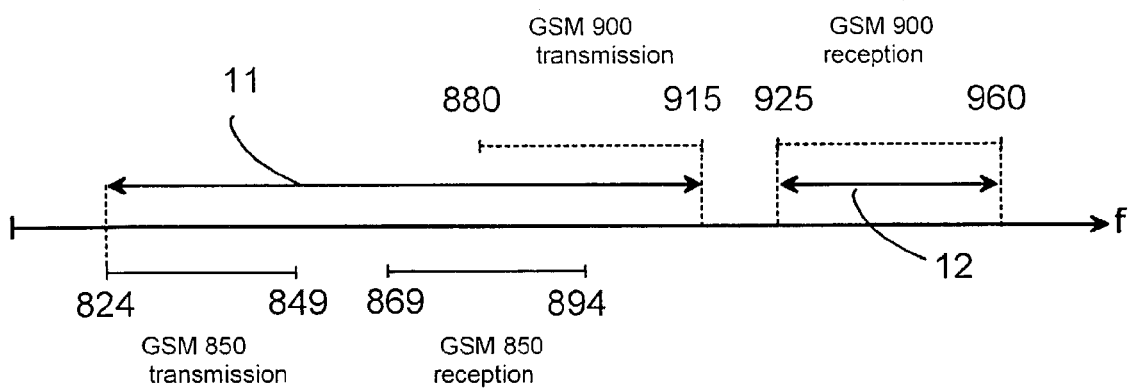
FIG. 3 and 4 show frequency bands assigned for different antennas.
Figure 4:
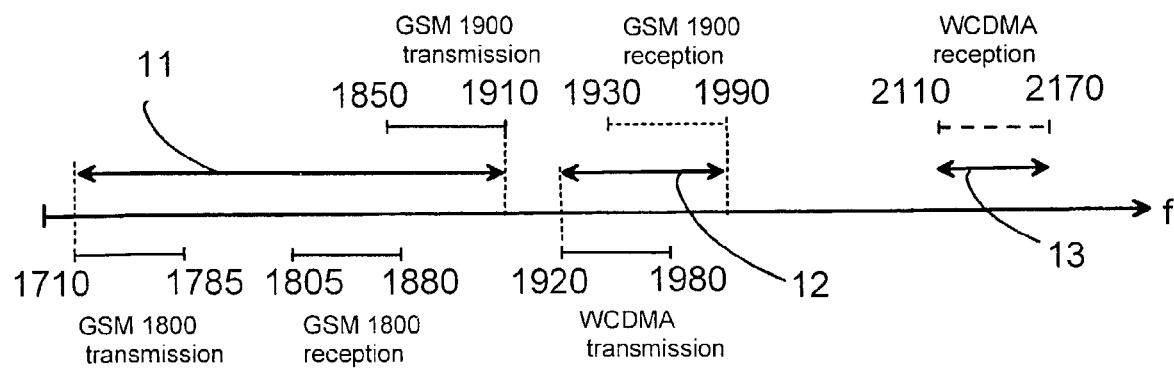

In FIGS. 3 and 4 one way of dividing the frequency bands of different systems between three antennas is illustrated in a way of example. In table 1 the transmission and reception frequency bands of the systems in the example are presented.

TABLE 1

| System | transmission frequency band (MHz) | reception frequency band (MHz) |
| --- | --- | --- |
| GSM 850 | 824-849 | 869-894 |
| GSM 900 | 880-915 | 925-960 |
| GSM 1800 | 1710-1785 | 1805-1880 |
| GSM 1900 | 1850-1910 | 1930-1990 |
| CDMA2000 | 1850-1910 | 1930-1990 |
| WCDMA | 1920-1980 | 2110-2170 |

A terminal corresponding to the invention comprises many alternatives of implementation. In other words the terminal supports at least some of the systems mentioned and part of the frequency bands mentioned in table 1.

In the first preferable embodiment of the invention the terminal comprises GSM 900, GSM 1800 and GSM 1900 systems. In the second preferable embodiment of the invention the terminal comprises GSM 900 and WCDMA systems. In the third preferable embodiment of the invention the terminal comprises GSM 850, GSM 900 and WCDMA systems.

In the fourth preferable embodiment of the invention the terminal comprises GSM 850, GSM 900, GSM 1800, GSM 1900 and WCDMA systems. In the fifth preferable embodiment of the invention the terminal comprises GSM 850, GSM 1800 and CDMA 2000 systems. The terminal may also include other combinations of the systems mentioned above. Even though above the issue is discussed from the point of view of the systems contained in the terminal, it is possible to use the frequency bands available in the terminal in an analogous way, since the systems and frequency bands may vary for example from country to country.

FIG. 3 illustrates the frequency bands covered by antennas 11 and 12. Antenna 11 covers the frequency band 824-915 MHz and antenna 12 the frequency band 925-960 MHz. When the terminal operates in a GSM 850 system, it transmits and receives signals through antenna 11, because the transmission and reception frequency bands it comprises (824-849 MHz and 869-894 MHz) are contained in their entirety in the frequency area covered by antenna 11. When the terminal operates in a GSM 900 system (880-915 MHz) antenna 11 is used for the transmission of the signal and antenna 12 for reception of the signal (925-960 MHz).

FIG. 4 shows the frequency areas covered by antennas 11, 12 and 13 of which antenna 11 covers the frequency area 1710-1910 MHz, antenna 12 the frequency area 1920-1990 MHz and antenna 13 the frequency area 2110-2170 MHz. In this case, when the terminal operates in a GSM 1800 system antenna 11 is used for transmission (1710-1785 MHz) and reception (1805-1880 MHz) of the signal. When the terminal operates in a GSM 1900 system antenna 11 is used for transmission (1850-1910 MHz) of the signal and antenna 12 for reception (1930-1990 MHz) of the signal. While operating in WCDMA system, the terminal also uses two antennas. In this case the terminal transmits signals (1920-1980 MHz) through antenna 12 and receives signals (2110-2170 MHz) through antenna 13.

Figure 5:
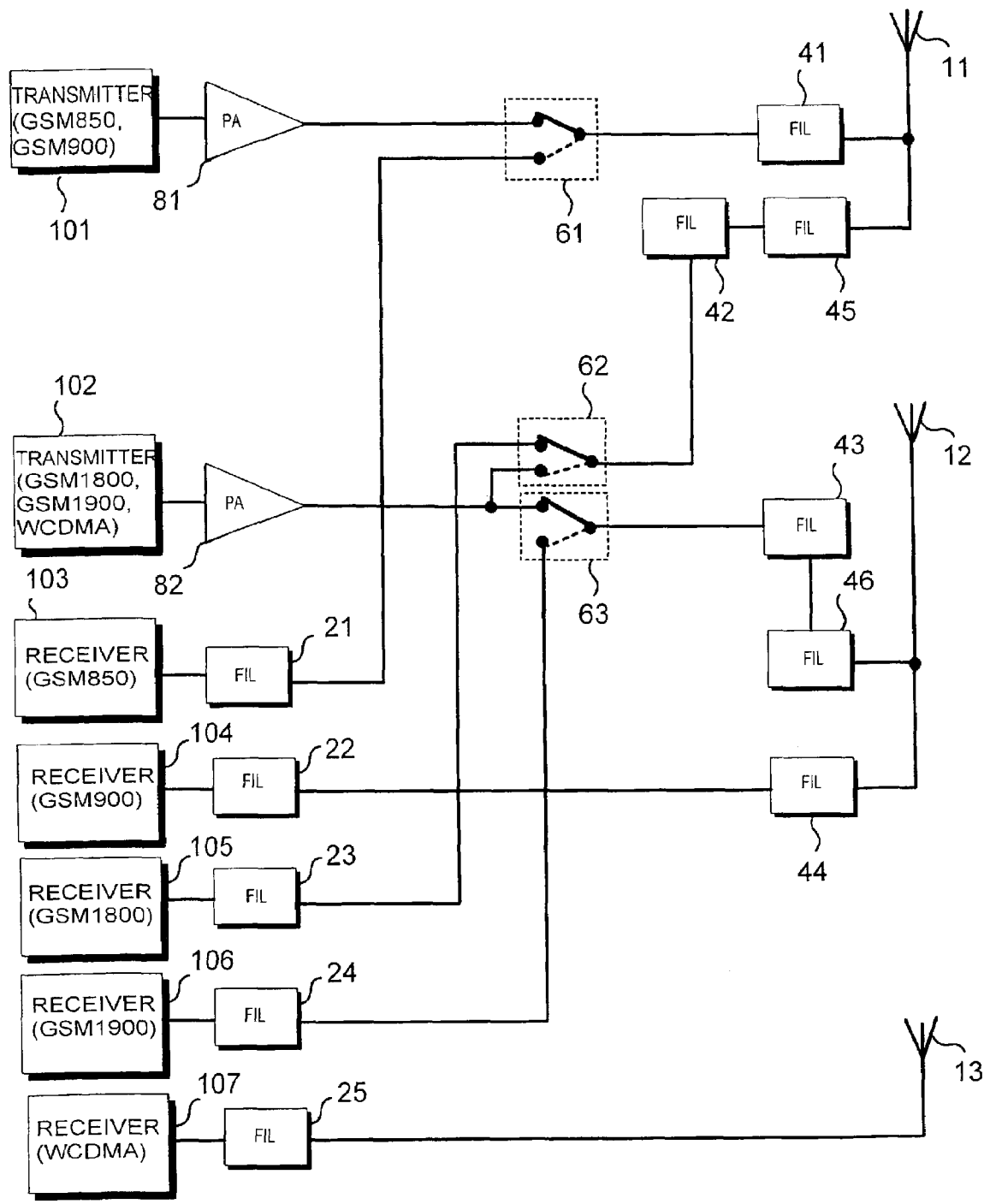
FIG. 5 presents the terminal device in more detail showing the parts pertaining to the antenna arrangement.

FIG. 5 shows an antenna arrangement consisting of three antennas (11, 12 and 13) in more detail. Let's presume that the antennas we're considering here are for example microstrip or PIFA antennas (Planar Inverted F Antenna) installed inside a mobile station. The radiation pattern of PIFA antenna is particularly good and is suitable for use in a wide frequency band.

Besides the antennas, the antenna arrangement consists of two power amplifiers 81-82, five bandpass filters 21-25, three switches 61-63, four low-pass filters 41-44, two high-pass filters 45-46 two transmitters 101-102 and five receivers 103-107. The arrangement can be realized utilizing components that are commercially available. The switches can be produced for example by components based on the so-called MEMS technology (Micro-electromechanical Systems) such as microrelays. Such switches are much smaller physically than for example semiconductor switches. Due to its process technology and structure, it is easy to capsulate a microrelay in regular SMD cases (Surface Mount Devices). Optionally the switches may be produced traditionally for example by means of a PIN diode or FET switch in an integrated monolithic microwave circuit (MMIC=Monolithic Microwave Integrated Circuit); such switches are well suited for usage in connection applications of various high-frequency signals.

The power amplifier 81 in the transmission end of the terminal has been adapted to amplify signals of the frequency bands 824-849 MHz and 880-915 MHz of the GMS 850 and GSM 900 systems arriving from the transmitter 101. The amplified signals are connected by means of the switch 61 connected to the output of the power amplifier to the input of low-pass filter 41. The boundary frequency of the passband of the low-pass filter is greater or equal to 915 MHz. The filtered signals are taken to antenna 11, from which they are transmitted to the radio way. In GSM 850 system the terminal is able at one time either to transmit or receive the signal.

While operating as a receiver in a GSM 850 system, the terminal receives signals arriving from the air through the antenna 11. The signals received are connected through the switch 61 to the bandpass filter 21, which has a passband in the range of 869-894 MHz. The filtered signals are transferred to the receiver 103.

As was mentioned above, the terminal uses antenna 11 for transmitting signals while operating in the GSM 900 system and antenna 12 for receiving signals. In this case the signals received are connected through the low-pass filter 44 to the bandpass filter 22, which has a passband in the range of 925-960 MHz. The filtered signals are transferred further to the receiver 104.

When the terminal is operating as a transmitter in a GSM 1800 system the power amplifier 82 located in the transmission end has been adapted to amplify the signals arriving from the transmitter 102. The output of the power amplifier has been connected both to switch 62 and switch 63. The amplified signal is connected through the switch 62 to the low-pass filter 42 and further through the high-pass filter 45 to the antenna 11, which in this case transmits the signal to the air to the frequency band 1710-1785 MHz.

While operating as a receiver in a GSM 1800 system the terminal receives signals by the antenna 11. The signals received are taken through the high-pass filter 45 and low-pass filter 42 to the switch 62, which connects the signals to he input of the bandpass filter 23. The passband of the filter is 1805-1880 MHz. The filtered signals are further-taken to the receiver 105.

The power amplifier 82 has also been adapted to amplify signals used in GSM 1900 systems and 3G systems of the USA, arriving from the transmitter 102. In this case the signals located in the frequency band 1850-1910 MHz are amplified and the amplified signals are connected by switch 62 through the low-pass filter 42 and high-pass filter 45 to antenna 11, from which they are transmitted to the radio way.

The power amplifier 82 has been adapted, besides those mentioned above, to amplify signals transmitted in WCDMA system, arriving from the transmitter 102. In this case the amplifier amplifies the signals located in the frequency band 1920-1980 MHz which are connected after the amplification by the switch 63 through the low-pass filter 43 and high-pass filter 46 to the antenna 12 and transmitted further to the radio way.

While operating as a receiver in GSM 1900 system or the 3G system of the USA the terminal receives signals through antenna 12. The signals received are filtered by the high-pass filter 46 and low-pass filter 43 before being taken to the switch 63, which guides the signals that passed through the filters to bandpass filter 24. The passband of the bandpass filter is 1930-1990 MHz. The filtered signals are taken to the receiver 106.

The terminal receives signals of WCDMA system from the radio way by antenna 13. The signals received are transferred directly from the antenna to bandpass filter 25, which has a passband of 2110-2170 MHz. The signals filtered in the bandpass filter are taken to the receiver 107.

Figure 6A:
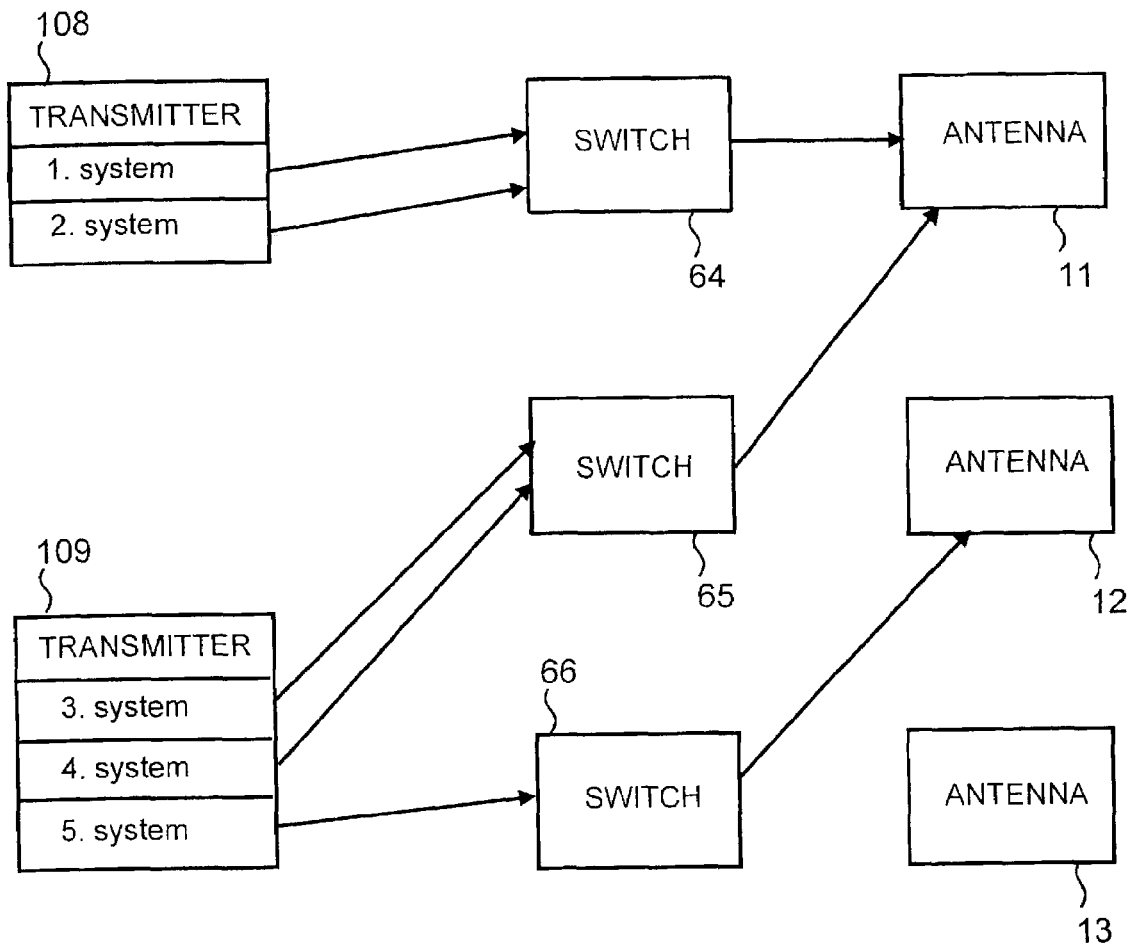
FIG. 6a illustrates how in an antenna arrangement corresponding to the invention the signals used by different mobile communication systems are transferred to the antennas, to be transmitted to the air.
Figure 6B:
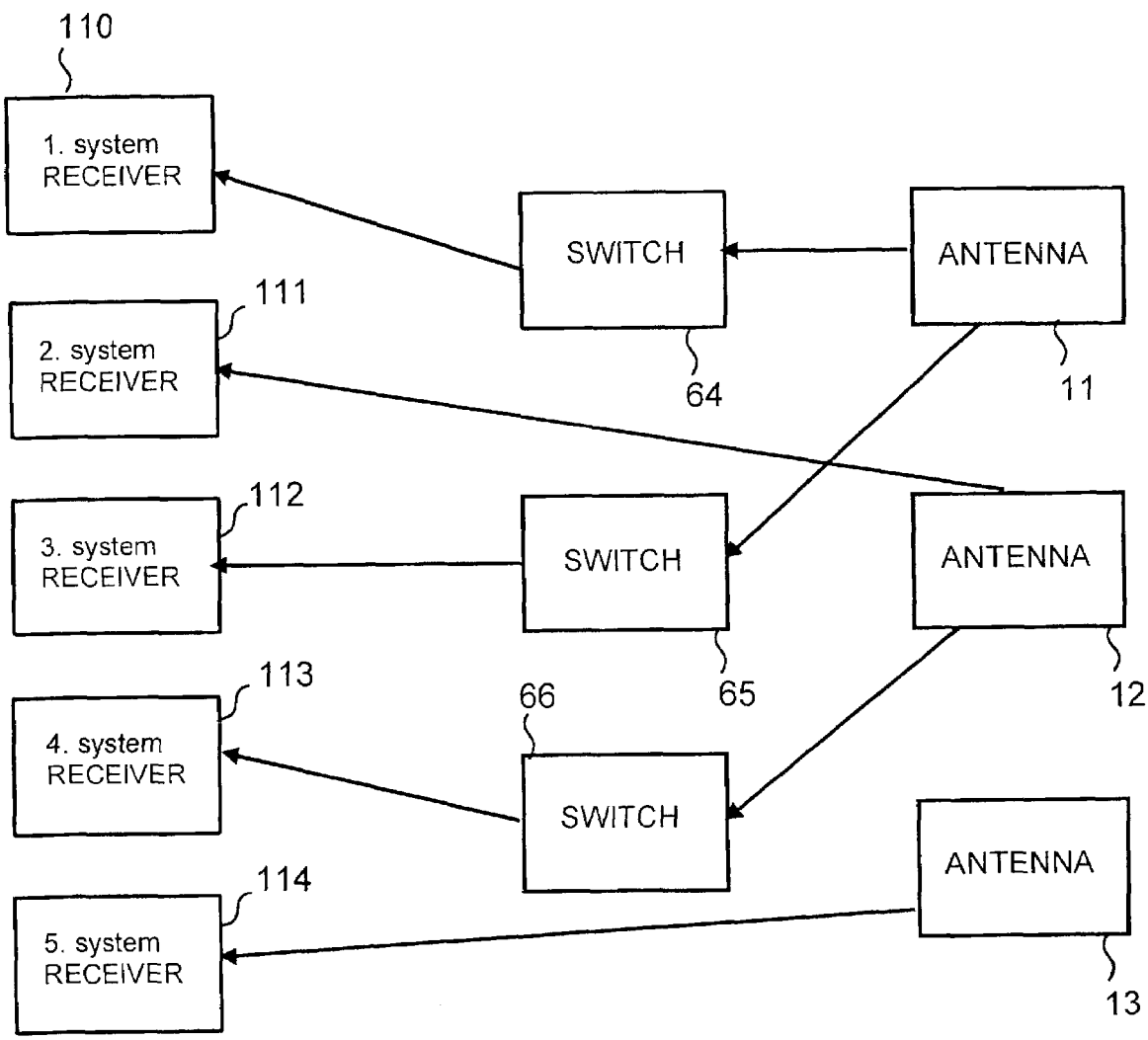
FIG. 6b illustrates how the signals of different mobile communication systems received from the air by the antennas are transferred to the receiver in an antenna arrangement corresponding to the invention.

To illustrate the antenna arrangement presented above it will be shown, by referring to FIG. 6a, how the signals of the corresponding five different mobile communication systems are transmitted to the air in the antenna arrangement and, by referring to the FIG. 6b, how the signals received from the air in the antenna arrangement are transferred in the antenna arrangement. The figures have been greatly simplified to clarify the issue, so for example the filters and amplifiers needed have been omitted in the picture.

In the FIG. 6a there are two transmitters 108 and 109, transmitter 108 transmitting signals of the first and second systems and transmitter 109 transmitting signals of the third, fourth and fifth systems. The signals of these systems are transferred through three controllable switches 64-66 to the antennas 11-12 in the following manner:

antenna 11 has been adapted to transmit to the air a) signals of the first and second systems which are transferred through the controllable switch 64 from transmitter 108 to antenna 11, b) signals of the third and fourth systems which are transferred through the controllable switch 65 from the transmitter 109 to antenna 11, and antenna 12 has been adapted to transmit signals of the fifth system which are transferred from transmitter 109 to antenna 12 through the controllable switch 66.

In FIG. 6b there are three antennas 11-13 which receive signals of five different mobile communication systems from the air which are transferred to five receivers 110-114 through three controllable switches 64-66 in the following manner:

antenna 11 has been adapted to receive from the air a) signals of the first system which are transferred through the controllable switch 64 to the receiver 110, b) signals of the third system which are transferred through the controllable switch 65 to the receiver 112, antenna 12 has been adapted to receive from the air a) signals of the second system which are transferred directly to receiver 111, b) Signals of the fourth system which are transferred through the controllable switch 66 to receiver 114, and antenna 13 has been adapted to receive from the air signals of the fifth system, which are transferred directly to the receiver 114.

In the following we will review more closely, by referring to the FIG. 7-9, a method for transmission and reception of signals in different implementations where the antenna arrangement is placed in a terminal. It should be noted that the examples of the method presented in the following represent only some of the various possibilities for implementation.

In the following, filters 21-25 are bandpass filters, filters 41-44 are low-pass filters, and filters 45-46 are high-pass filters.

Figure 7A:
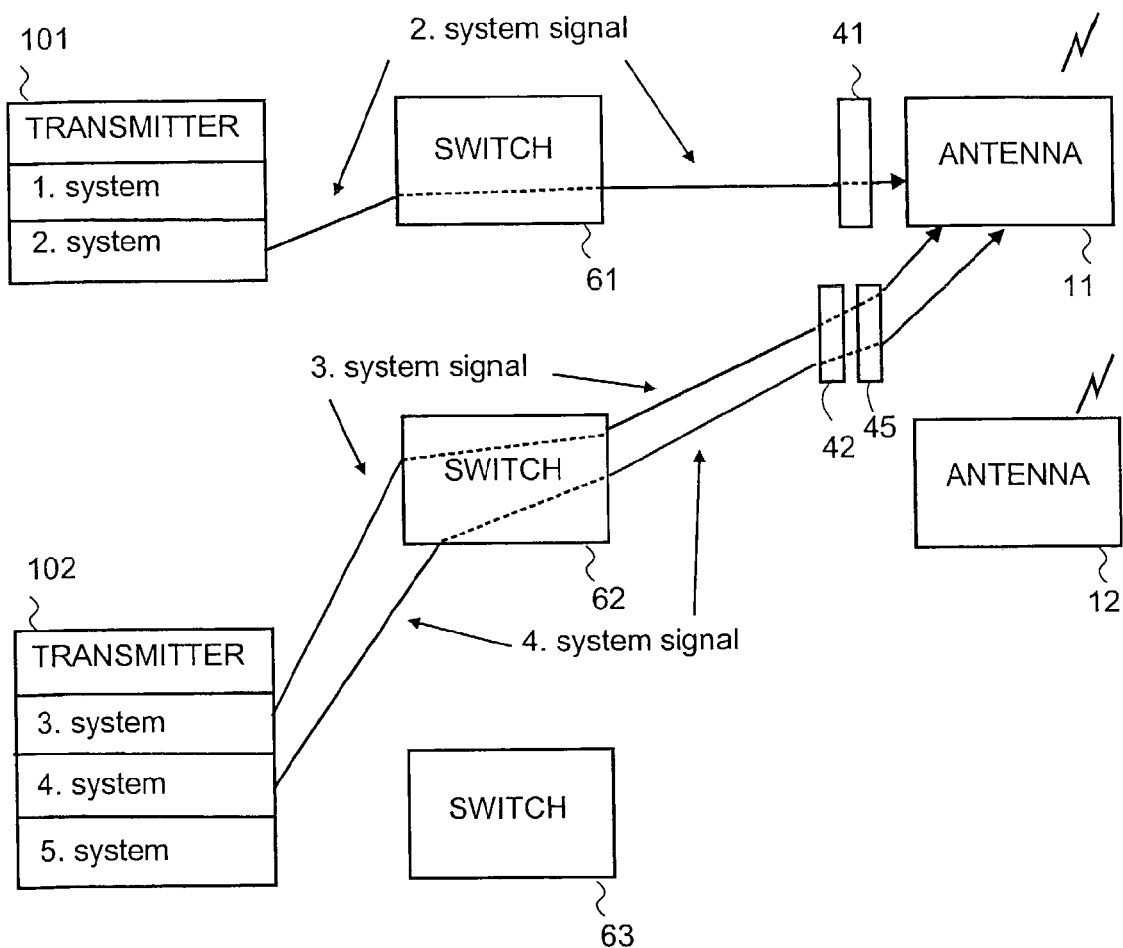
FIG. 7a-b illustrate a method for transmission and reception of signals in an antenna arrangement comprising two antennas.
Figure 7B:
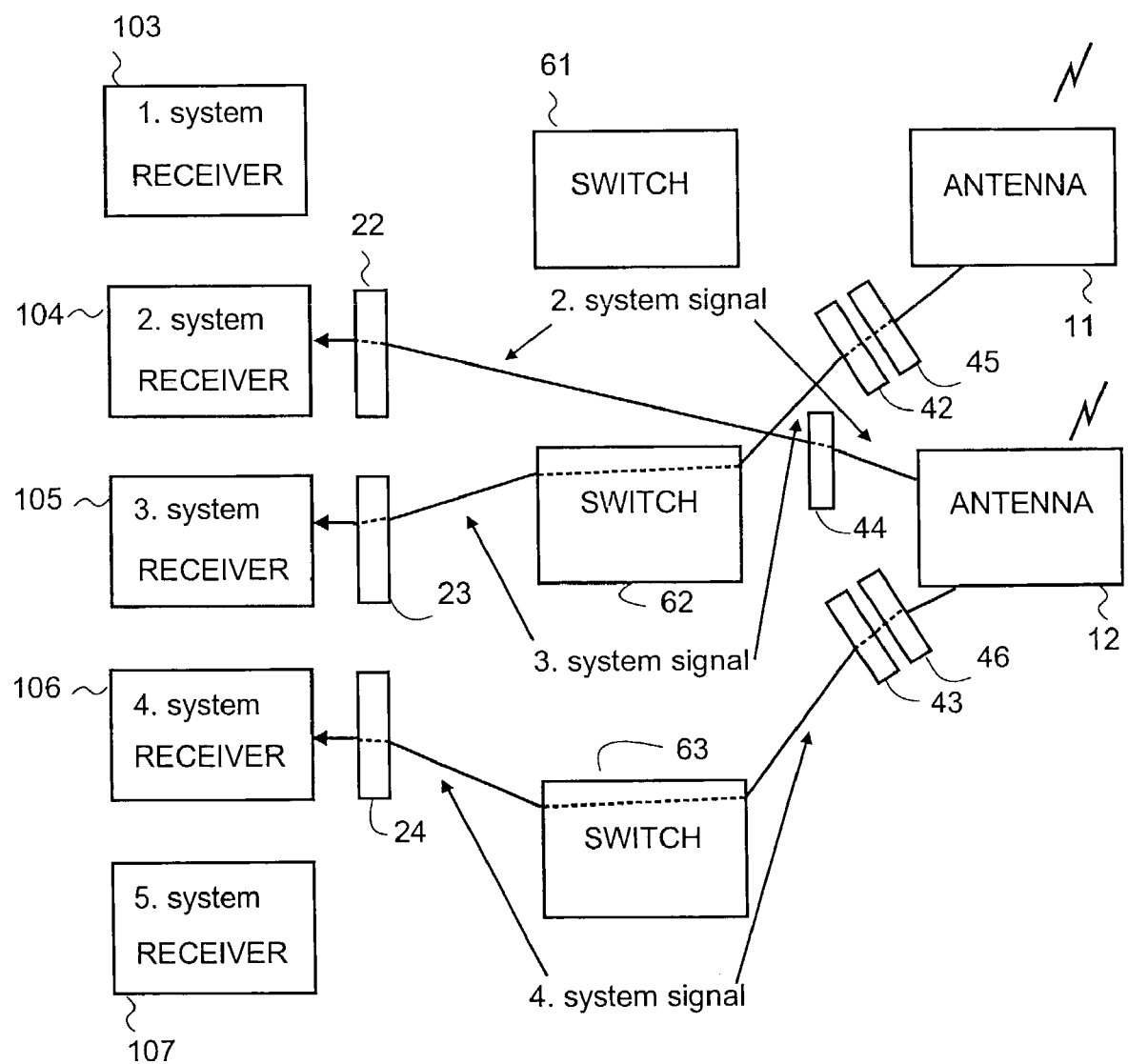

FIGS. 7a and 7b illustrate an antenna arrangement comprising two antennas 11 and 12.

In FIG. 7a signals of the second, third and fourth systems are transmitted through the antenna 11. More accurately signals of the second system, coming from the transmitter 101, are connected by the controllable switch 61 to the first antenna 11 through the filter 41. Signals of the third and fourth systems, coming from the transmitter 102, are connected by the controllable switch 62 to the antenna 11 through the filters 42 and 45.

In FIG. 7b signals of the third system are received through the antenna 11 and signals of the second and fourth systems are received through the antenna 12. More accurately signals of the third system, received by the antenna 11 are passed through the filters 42 and 45 and connected by the controllable switch 62 to the receiver 105 through the filter 23. Signals of the fourth system, received by the antenna 12 are passed through the filters 46 and 43 and connected by the controllable switch 63 to the receiver 106 through the filter 24. Signals of the second system received by the antenna 12 are passed through the filters 44 and 22 to the receiver 104.

Figure 8A:
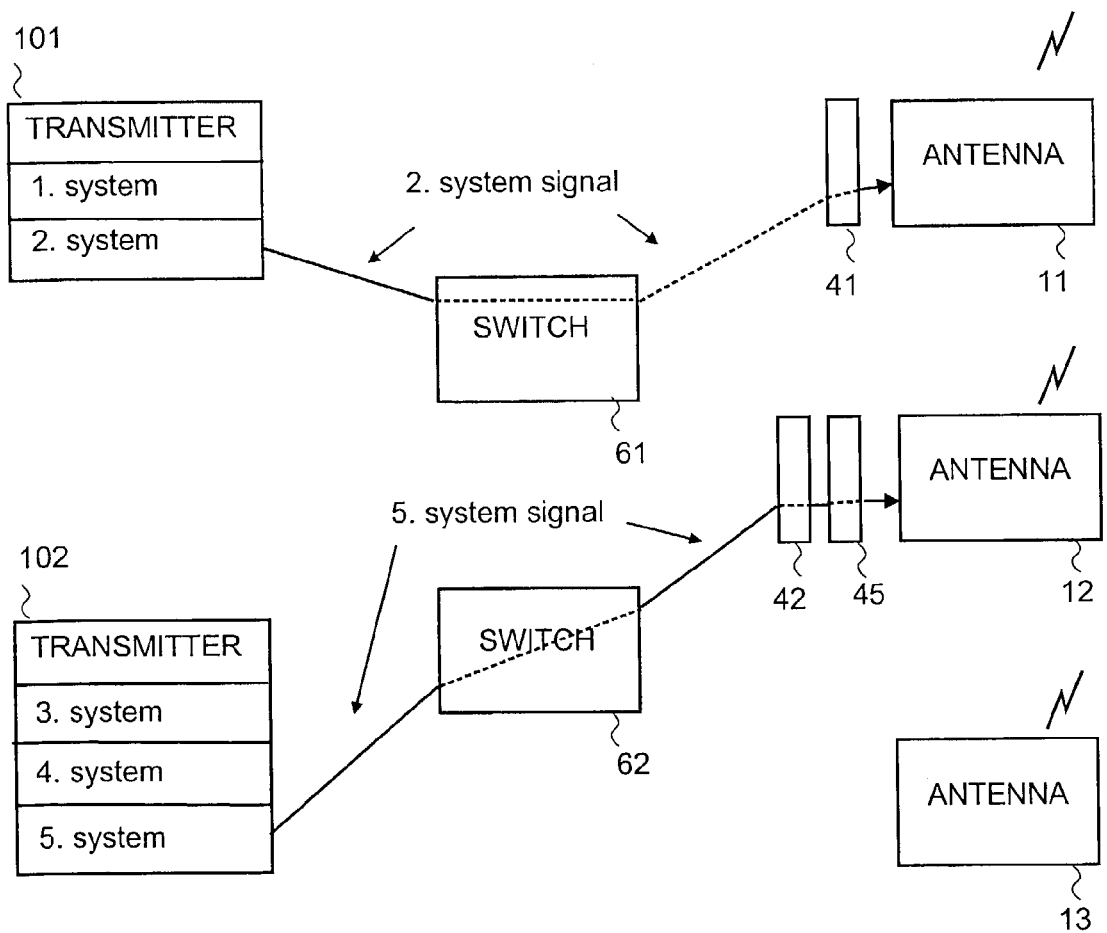
FIG. 8a-b illustrate a method for transmission and reception of signals in an antenna arrangement comprising three antennas.
Figure 8B:
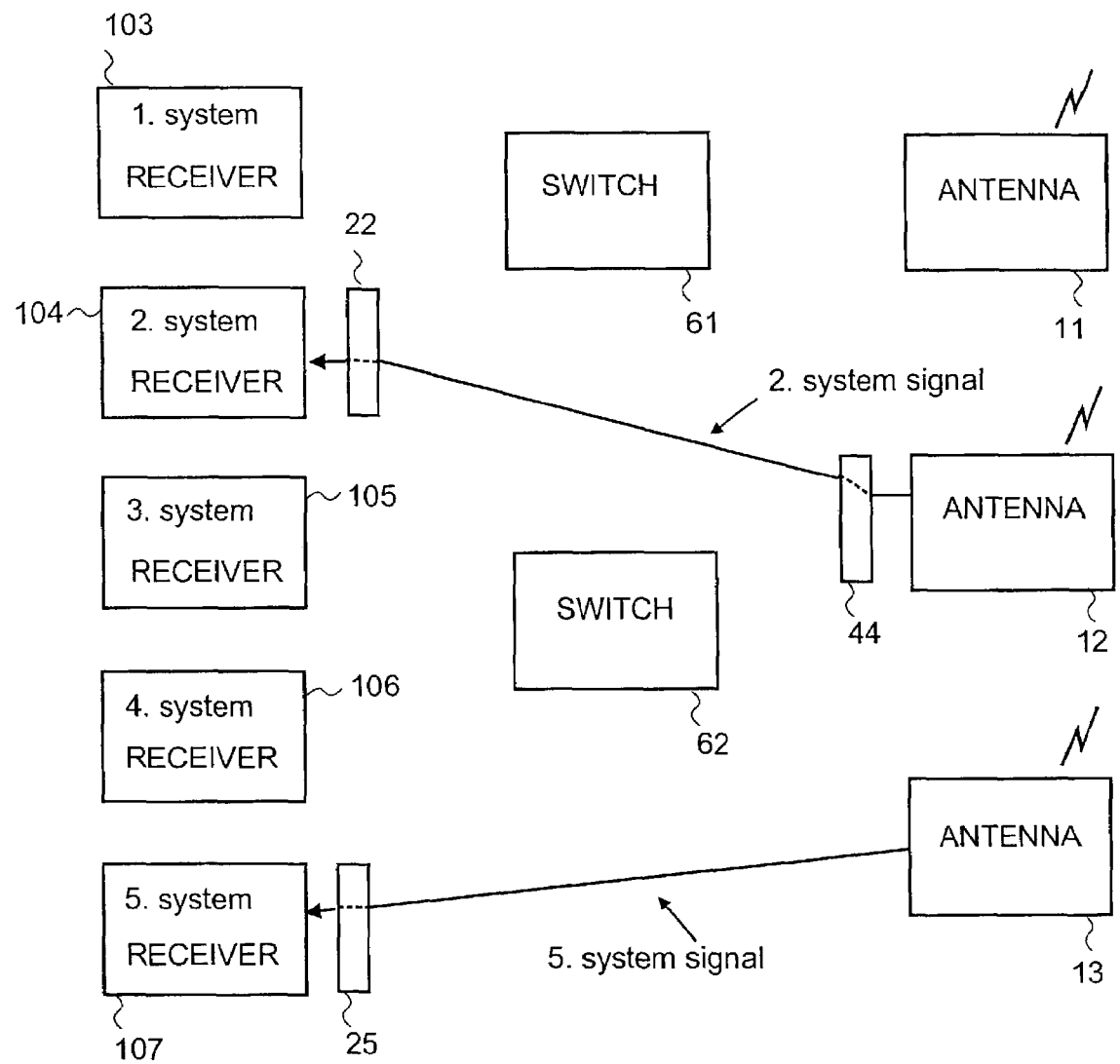

FIGS. 8a and 8b illustrate an antenna arrangement comprising three antennas 11, 12 and 13.

In FIG. 8a signals of the second system are transmitted through the antenna 11 and signals of the fifth system through the antenna 12. More accurately signals of the second system, coming from the transmitter 101 are connected by the controllable switch 61 to the antenna 11 through the filter 41. Signals of the fifth system, coming from the transmitter 102, are connected by the controllable switch 62 to the antenna 12 through the filters 42 and 45.

In FIG. 8b signals of the second system are received through the antenna 12 and transmitted to the receiver 104 through the filters 44 and 22. Signals of the fifth system are received through the antenna 13 and transmitted to the receiver 107 through the filter 25.

Figure 9A:
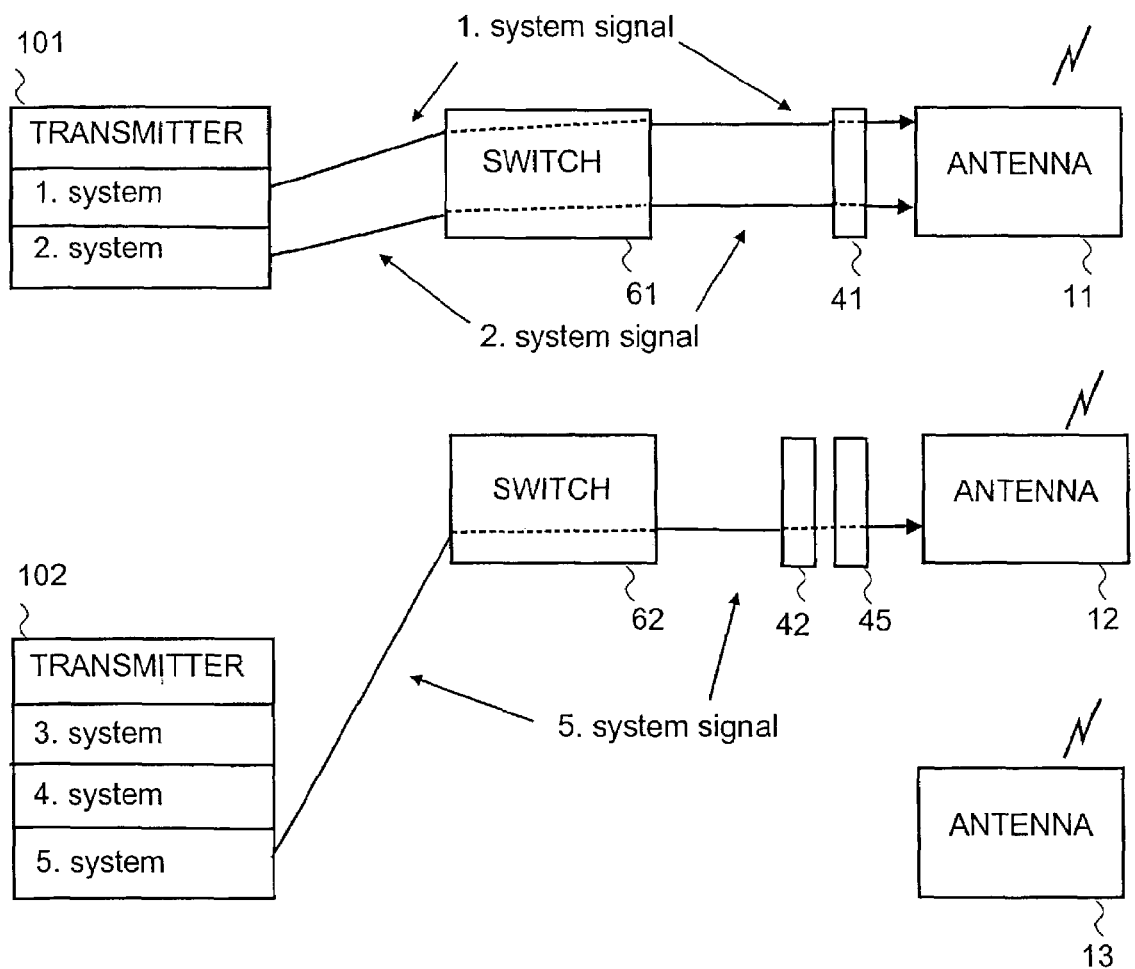
FIG. 9a-b illustrate a method for transmission and reception of signals in an-other antenna arrangement comprising three antennas.
Figure 9B:
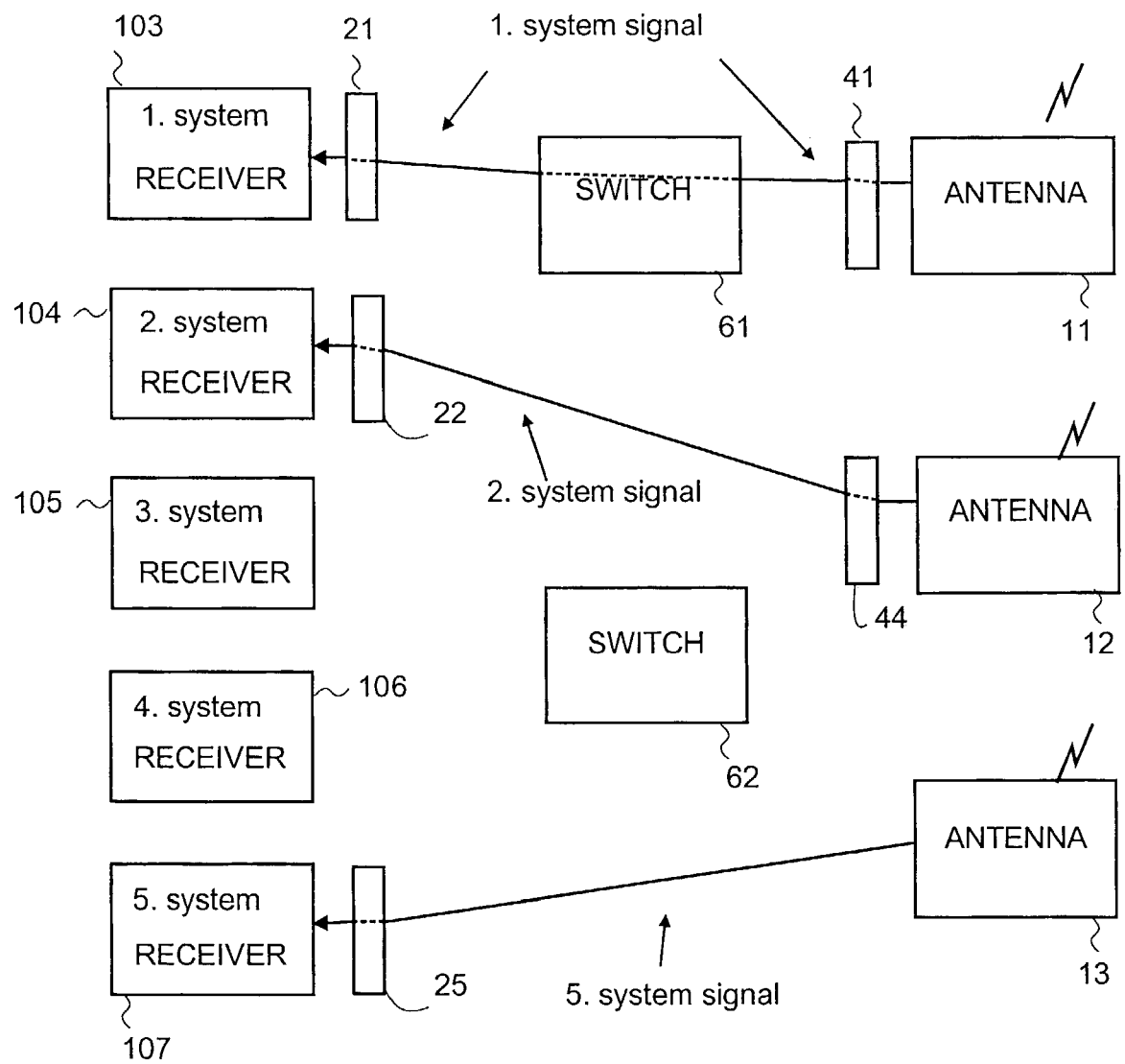

FIGS. 9a and 9b illustrate another antenna arrangement comprising three antennas 11, 12 and 13.

In FIG. 9a signals of the first system and the second system are transmitted through the antenna 11 and signals of the fifth system through the antenna 12. More accurately signals of the first system and the second system, coming from the transmitter 101, are connected by the controllable switch 61 to the antenna 11 through the filter 41. Signals of the fifth system, coming from the transmitter 102, are connected by the controllable switch 62 to the antenna 12 through the filters 42 and 45.

In FIG. 9b signals of the first system are received through the antenna 11, signals of the second system are received through the antenna 12 and signals of the fifth system are received through the antenna 13. More accurately signals of the first system, received by the antenna 11, are passed through the filter 41 and connected by the controllable switch 61 to the receiver 103 through the filter 21. Signals of the second system, received by the antenna 12 are transmitted to the receiver 104 through the filters 44 and 22. Signals of the fifth system, received by the antenna 13, are transmitted to the receiver 107 through the filter 25.

Even though the invention above has been presented by referring to the examples of the diagrams attached, it is obvious that the invention is not confined to them, but a professional in the field can modify the implementations presented without turning aside from the idea behind the invention.

The antenna arrangement can be realized in many different ways. It can be built inside the terminal or stretch outside the terminal. Type of the antennas doesn't limit the invention. Division of the frequency areas between the antennas is determined by the frequency bands of the systems used. Also the quantity of the other components presented in the example may vary depending on the implementation.

The invention claimed is:

1. An antenna arrangement which is operable in various mobile communication systems comprising a first, a second, a third, a fourth, and a fifth system which use different frequencies, the antenna arrangement, comprising transmitter/receivers of a multi-mode phone, at least two antennas, at least one filter placed between the first antenna and the transmitter/receivers by which signals to be transmitted are filtered before being taken to the first antenna and by which signals to be received through the first antenna are filtered, at least one controllable switch placed between the first antenna and the transmitter/receivers by which the signals to be transmitted are connected to the first antenna and by which the signals to be received through the first antenna are connected to one of the transmitter/receivers, wherein in an antenna arrangement consisting of two antennas the signals are transmitted so that the first antenna transmits signals of the second, third and fourth systems, and signals are received so that signals of the third system are received through the first antenna, signals of the second and fourth systems are received through the second antenna and wherein in an antenna arrangement consisting of three antennas the signals are transmitted so that the first antenna transmits signals of the second system, the second antenna transmits signals of the fifth system, and signals are received so that signals of the second system are received through the second antenna and signals of the fifth system are received through the third antenna.

2. The antenna arrangement as in claim 1, wherein in an antenna arrangement consisting of three antennas in addition the first antenna transmits signals of the first system and signals of the first system are received through the first antenna.

3. The antenna arrangement as in claim 1, wherein the antenna arrangement comprises a controllable switch which is used to connect the signals of the third and fifth systems coming from the transmitter to the first antenna.

4. The antenna arrangement as in claim 1, wherein it includes two controllable switches of which the first controllable switch is used to connect the signals of the third system received by the first antenna to the receiver, the second controllable switch is used to connect the signals of the fourth system received by the second antenna to the receiver and the signals of the second system received by the second antenna are taken directly to the receiver.

5. The antenna arrangement as in claim 1, wherein the antenna arrangement includes two controllable switches of which the first controllable switch is used to connect the signals of the second system coming from the transmitter to the first antenna, and the second controllable switch is used to connect to the signals of the fifth system coming from the transmitter to the second antenna.

6. The antenna arrangement as in claim 1, wherein in the antenna arrangement the signals of the second system received by the second antenna are taken directly to the receiver, and the signals of the fifth system received by the third antenna are taken directly to the receiver.

7. The antenna arrangement as in claim 2, wherein the antenna arrangement comprises two controllable switches of which the first controllable switch is used to connect the signals of the first and second system coming from the transmitter to the first antenna, and the second switch is used to connect the signals of the fifth sys-tem to the second antenna.

8. The antenna arrangement as in claim 2, wherein the antenna arrangement comprises two controllable switches of which the first controllable switch is used to connect the signals of the first system received by the first antenna to the receiver, the signals of the second system received by the second antenna are taken directly to the receiver, and the signals of the fifth system received by the third antenna are taken directly to the receiver.

9. The antenna arrangement as in claim 1, wherein the first system is GSM850 and/or US-TDMA850 system, the second system is GSM900 and/or US-TDMA1900 system, the third system is GSM1800 system, the fourth system is GSM1900 system and the fifth sys-tem is WCDMA and/or CDMA2000 system.

10. A terminal operable in various mobile communication systems comprising a first, a second, a third, a fourth, and a fifth system which use different frequencies, said terminal having an antenna arrangement comprising transmitter/receivers of a multi-mode phone, at least two antennas, at least one filter placed between the first antenna and the transmitter/receivers by which signals to be transmitted are filtered before being taken to the first antenna and by which signals to be received through the first antenna are filtered, at least one controllable switch placed between the first antenna and the transmitter/receivers by which the signals to be transmitted are connected to the first antenna and by which the signals to be received through the first antenna are connected to one of the transmitter/receivers, wherein in an antenna arrangement consisting of two antennas the signals are transmitted so that the first antenna transmits signals of the second, third and fourth systems, and signals are received so that signals of the third system are received through the first antenna, signals of the second, third and fourth systems are received through the second antenna, and wherein in an antenna arrangement consisting of three antennas the signals are transmitted so that the first antenna transmits signals of the second system, the second antenna transmits signals of the fifth system, and the signals are received so that signals of the second system are received through the second antenna, and signals of the fifth system are received through the third antenna.

11. The terminal as in claim 10, wherein in an antenna arrangement consisting of three antennas in addition the first antenna transmits signals of the first system and signals of the first system are received through the first antenna.

12. The terminal as in claim 10, wherein the first system is GSM850 and/or US-TDMA850 system, the second system is GSM900 and/or US-TDMA1900 system, the third system is GSM1800 system, the fourth system is GSM1900 system and the fifth system is WCDMA and/or CDMA2000 system.

13. A method for transmission and reception of signals in a multi-mode phone operable in various mobile communication systems comprising a first, a second, a third, a fourth, and a fifth system which use different frequencies, the multi-mode phone comprising transmitter/receivers, controllable switches, filters, and at least two antennas, wherein in an antenna arrangement consisting of two antennas the signals are transmitted so that signals of the second system, coming from the first transmitter are connected by the first controllable switch to the first antenna and filtered by the first filter before transmission through the first antenna, the signals of the third and fourth systems, coming from the second transmitter are connected by the second controllable switch to the first antenna and filtered by the second filter and the third filter before transmission through the first antenna, and signals are received so that signals of the third system are received through the first antenna and filtered by the second and the third filters and then connected by the second controllable, switch to the receiver, and signals of the second and fourth systems are received through the second antenna, and wherein in an antenna arrangement consisting of three antennas signals are transmitted so that signals of the second system are transmitted through the first antenna and signals of the fifth system through the second antenna, and signals are received so that signals of the second system are received through the second antenna and signals of the fifth system are received through the third antenna.

14. The method as in claim 13, wherein in an antenna arrangement consisting of three antennas in addition signals of the first system are transmitted through the first antenna, and signals of the first system are received through the first antenna.

15. The method as in claim 13, wherein in an antenna arrangement comprising two controllable switches signals of the second system, coming from the transmitter, are connected by the first controllable switch to the first antenna, and signals of the fifth system, coming from the transmitter, are connected by the second controllable switch to the antenna.

16. The method as in claim 13, wherein in an antenna arrangement signals of the second system received by the second antenna are taken directly to the receiver and signals of the fifth system received by the third antenna directly to the receiver.

17. The method as in claim 14, wherein in an antenna arrangement comprising two controllable switches signals of the first and second systems coming from the transmitter are connected by the first controllable switch to the first antenna, and signals of the fifth system are connected by the second switch to the second antenna.

18. The antenna arrangement as in claim 14, wherein in an antenna arrangement comprising two controllable switches signals of the first system, received by the first antenna, are connected by the first controllable switch to the receiver, signals of the second system, received by the second antenna, are taken directly to the receiver, and signals of the fifth system, received by the third antenna, are taken directly to the receiver.

19. The method as in claim 13, wherein the first system is GSM850 and/or US-TDMA850 system, the second system is GSM900 and/or US-TDMA1900 system, the third system is GSM1800 sys-tem, the fourth system is GSM1900 system and the fifth system is WCDMA and/or CDMA2000 system.

* * * * *